US011892822B2

(12) United States Patent
Hayashi et al.

(10) Patent No.: US 11,892,822 B2
(45) Date of Patent: Feb. 6, 2024

(54) MAINTENANCE SUPPORT SYSTEM, MAINTENANCE SUPPORT METHOD AND MAINTENANCE MANAGEMENT SERVER

(71) Applicant: Mitsubishi Electric Corporation, Tokyo (JP)

(72) Inventors: Hidematsu Hayashi, Tokyo (JP); Naoya Terasawa, Tokyo (JP); Takashi Saeki, Tokyo (JP); Masaya Harakawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/266,605

(22) PCT Filed: Jan. 8, 2021

(86) PCT No.: PCT/JP2021/000557
§ 371 (c)(1),
(2) Date: Jun. 12, 2023

(87) PCT Pub. No.: WO2022/149279
PCT Pub. Date: Jul. 14, 2022

(65) Prior Publication Data
US 2023/0393561 A1 Dec. 7, 2023

(51) Int. Cl.
*G06F 15/16* (2006.01)
*G05B 19/418* (2006.01)
(Continued)

(52) U.S. Cl.
CPC .......... *G05B 19/4184* (2013.01); *G16Y 40/10* (2020.01); *G16Y 40/40* (2020.01)

(58) Field of Classification Search
CPC ..... G05B 19/4184; G16Y 40/10; G16Y 40/40
See application file for complete search history.

(56) References Cited

U.S. PATENT DOCUMENTS

2016/0300030 A1* 10/2016 Vann, Jr. ................ H04N 7/152
2018/0241967 A1   8/2018 Aikawa et al.
(Continued)

FOREIGN PATENT DOCUMENTS

JP   2000-057226 A   2/2000
JP   2000-222026 A   8/2000
(Continued)

OTHER PUBLICATIONS

International Search Report and Written Opinion dated Mar. 23, 2021, received for PCT Application PCT/JP2021/000557, filed on Jan. 8, 2021, 9 pages including English Translation.
(Continued)

*Primary Examiner* — John B Walsh
(74) *Attorney, Agent, or Firm* — XSENSUS LLP

(57) ABSTRACT

A maintenance support system includes a wearable device that provides an on-site maintenance worker with maintenance instruction information; a plurality of maintenance support terminals installed in a plurality of regions having time differences; and a maintenance management server connected to the wearable device and the maintenance support terminals. The maintenance management server includes a representative selection unit that selects a maintenance support terminal on the basis of representative level information, the standard work hours being fixed for each of the plurality of regions; and a translation unit that translates audio information transmitted and received between the wearable device and the maintenance support terminal selected by the representative selection unit on a basis of a language set on the wearable device and a language set on the maintenance support terminal selected by the representative selection unit.

13 Claims, 4 Drawing Sheets

(51) Int. Cl.
*G16Y 40/10* (2020.01)
*G16Y 40/40* (2020.01)

(56) References Cited

U.S. PATENT DOCUMENTS

2018/0307045 A1   10/2018  Nishi
2020/0400957 A1*  12/2020  Van Heugten ..... G02B 27/0172

FOREIGN PATENT DOCUMENTS

| JP | 2001-160097 A | 6/2001 |
| JP | 2001-344015 A | 12/2001 |
| JP | 2007-052212 A | 3/2007 |
| JP | 2011-150399 A | 8/2011 |
| JP | 2015-032259 A | 2/2015 |
| JP | 2017-097712 A | 6/2017 |
| JP | 2018-181232 A | 11/2018 |
| WO | 2017/158718 A1 | 9/2017 |

OTHER PUBLICATIONS

Notice of Reasons for Refusal dated Oct. 26, 2021, received for JP Application 2021-530255, 8 pages including English Translation.
Decision to Grant dated Mar. 1, 2022, received for JP Application 2021-530255, 5 pages including English Translation.

\* cited by examiner

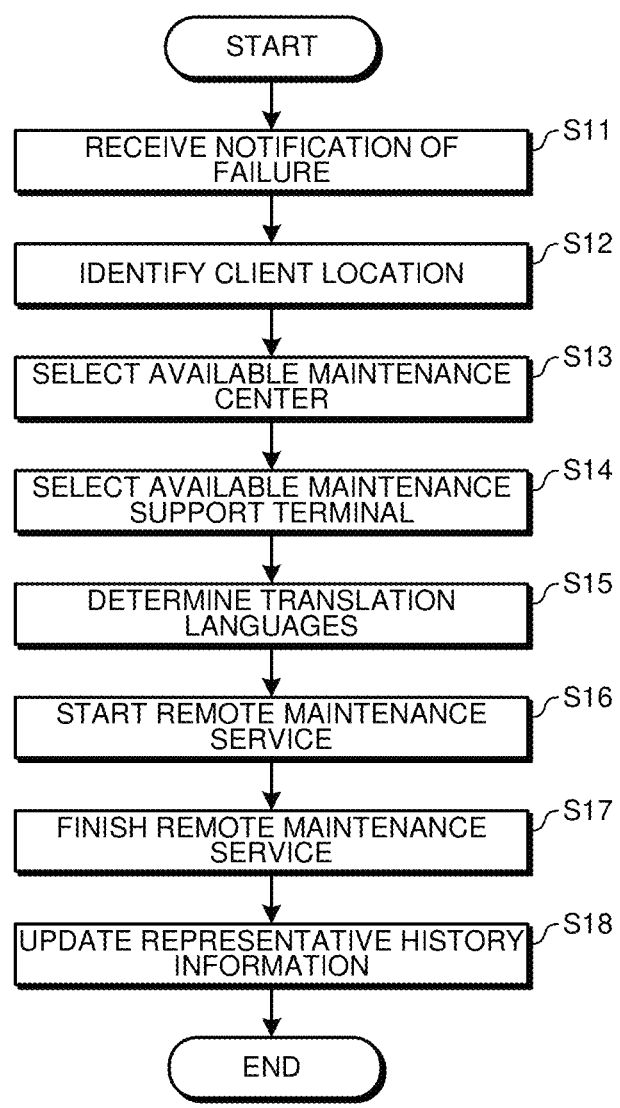

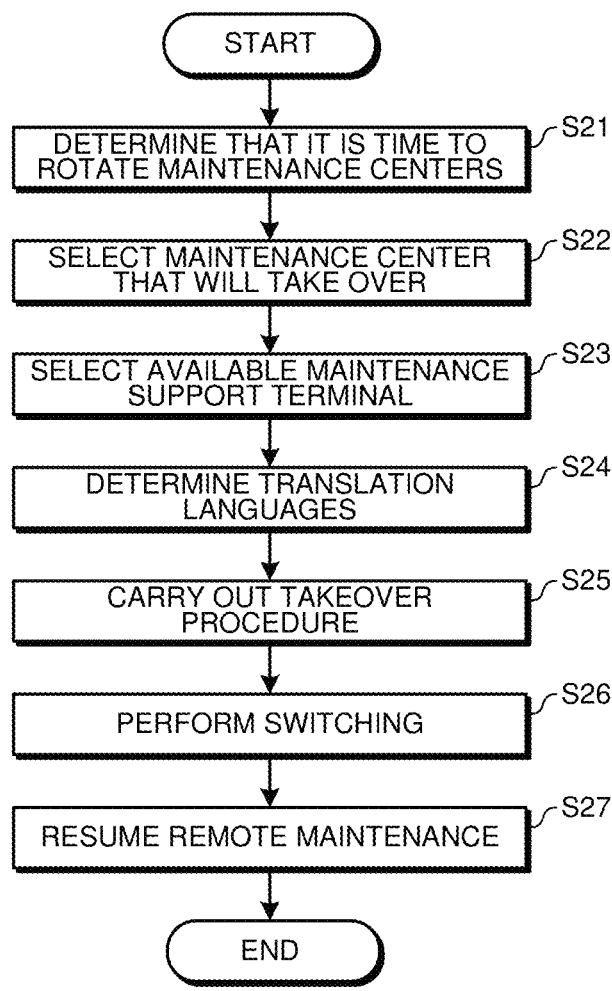
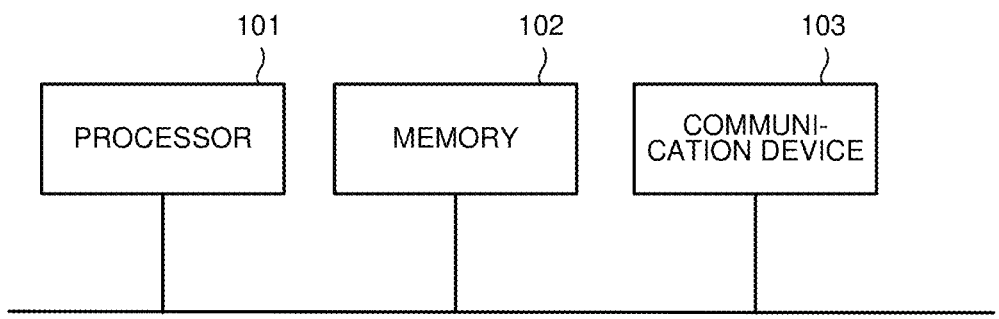

MAINTENANCE SUPPORT SYSTEM, MAINTENANCE SUPPORT METHOD AND MAINTENANCE MANAGEMENT SERVER

CROSS-REFERENCE TO RELATED APPLICATION

The present application is based on PCT filing PCT/JP2021/000557, filed Jan. 8, 2021, the entire contents of which are incorporated herein by reference.

FIELD

The present disclosure relates to a maintenance support system, a maintenance support method and a maintenance management server that provide remote support for a worker in charge of maintenance of plant equipment in a factory or the like.

BACKGROUND

What is being considered is a maintenance support system that enables 24-hour maintenance support by causing three or more maintenance centers with different daytime hours, namely different standard work hours, located worldwide, to take turns based on their hours for providing audio and visual maintenance support for a maintenance client's on-site worker who wears a wearable device with a communication function.

To provide 24-hour support for maintenance of a plant or factory that operates long hours, for example, 24 hours a day, a maintenance support provider has secured, for example, local workers available for work at night, late at night, and early in the morning by contract. However, problems with this case include high contract costs for the maintenance support and lack of available workers, among others.

In a remote monitoring system disclosed in Patent Literature 1, three or more monitoring centers with different daytime office hours (standard work hours), located worldwide, rotate on the basis of their standard work hours to provide an apparatus that has a failure with 24-hour remote maintenance through a local monitoring terminal that monitors the failure and performs operation control. The monitoring centers include a database that stores information relating to the failure of the apparatus, an available center selection function with which a monitoring center that responds to the equipment failure is selected, and a translation processing function. The translation processing function is applied to maintenance instructions from the monitoring center to a side with the failure and data transmission and reception between databases. An example of translation processing of a maintenance instruction from the monitoring center to the side with the failure is such that when a German who belongs to the monitoring center in Germany is in charge of remote maintenance of an apparatus installed in Japan, a maintenance instruction given in German at the monitoring center undergoes the translation processing to be played as Japanese guidance for the side with the failure.

CITATION LIST

Patent Literature

Patent Literature 1: Japanese Patent Application Laid-open No. 2001-344015

SUMMARY

Technical Problem

However, a problem with the technique described in Patent Literature 1 is that the monitoring center can only obtain various data on a situation of a maintenance site (namely, maintenance target place) through the local monitoring terminal, not being provided with a means to obtain observation information of a worker who is actually at a maintenance site, site image information, and others. Therefore, there is a possibility that support appropriate to the situations of the site and the worker is not provided.

The present disclosure has been made in view of the above, and an object of the present disclosure is to obtain a maintenance support system capable of providing maintenance support appropriate to a situation of a site for an on-site maintenance worker.

Solution to Problem

In order to solve the above problem and achieve the object, the present disclosure includes: a wearable device to provide an on-site maintenance worker with maintenance instruction information indicating contents of maintenance work to be performed by the on-site maintenance worker; a plurality of maintenance support terminals installed in a plurality of regions having time differences, at least one of the maintenance support terminals being installed in each of the plurality of regions; and a maintenance management server connected to the wearable device and the maintenance support terminals. The maintenance management server includes: a representative selection unit to select, from among maintenance support terminals installed in a region belonging to standard work hours, a maintenance support terminal that takes charge of maintenance support for the on-site maintenance worker on a basis of representative level information, the standard work hours being fixed for each of the plurality of regions; and a translation unit to translate audio information transmitted and received between the wearable device and the maintenance support terminal selected by the representative selection unit on a basis of a language set on the wearable device and a language set on a maintenance support terminal selected by the representative selection unit.

Advantageous Effect of Invention

The maintenance support system according to the present disclosure has an effect of providing maintenance support appropriate to a situation of a site for the on-site maintenance worker.

BRIEF DESCRIPTION OF DRAWINGS

FIG. 3 is a flowchart illustrating an example of how a maintenance management server operates upon receiving from a wearable device a notification that a failure has occurred.

FIG. 4 is a flowchart illustrating an example of how the maintenance management server operates in switching to a maintenance support terminal that will take charge of maintenance support.

FIG. 5 is a diagram illustrating an example of hardware that is used to implement the maintenance management server of the maintenance support system.

DESCRIPTION OF EMBODIMENT

With reference to the drawings, a detailed description is hereinafter provided of a maintenance support system, a maintenance support method and a maintenance management server according to an embodiment of the present disclosure.

Embodiment

Figure 1:
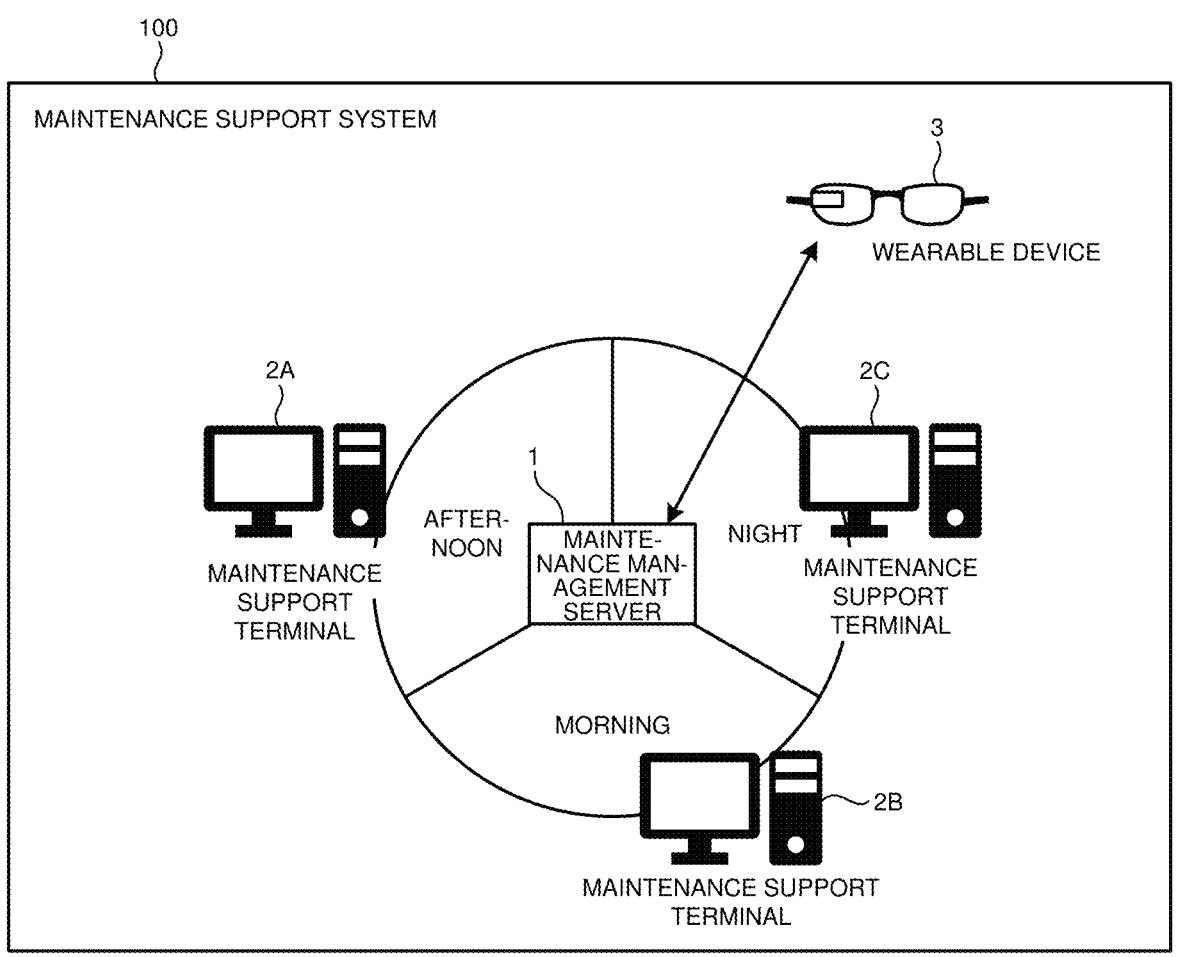
FIG. 1 is a diagram schematically illustrating a configuration example of a maintenance support system according to an embodiment.

FIG. 1 is a diagram schematically illustrating a configuration example of a maintenance support system according to an embodiment.

The maintenance support system 100 includes maintenance support terminals 2A, 2B, and 2C installed in at least three maintenance centers with different standard work hours (daytime hours) located worldwide, a wearable device 3 that a worker working at a maintenance site (namely, maintenance target place) has, and a maintenance management server 1 connected to the maintenance support terminals 2A, 2B, and 2C and the wearable device 3. The maintenance management server 1 may be provided on a cloud. In the description, remote support for work that the worker at the maintenance site performs is hereinafter described as "maintenance support".

In the maintenance support system 100, one or more locations are in the standard work hours at all times. When the number of the locations is three, as illustrated in FIG. 1, there is an 8-hour gap in standard work hours between the locations. In the example illustrated in FIG. 1, at the same time that the standard work hours of the location where the maintenance support terminals 2A are installed are over, the standard work hours of the location where the maintenance support terminals 2B are installed start. At the same time that the standard work hours of the location where the maintenance support terminals 2B are installed are over, the standard work hours of the location where the maintenance support terminals 2C are installed start. At the same time that the standard work hours of the location where the maintenance support terminals 2C are installed are over, the standard work hours of the location where the maintenance support terminals 2A are installed start. In below descriptions in which the maintenance support terminals do not need to be distinguished from one another, such as descriptions of items common to the maintenance support terminals 2A to 2C, the maintenance support terminals 2A to 2C may collectively be described as the maintenance support terminals 2.

A situation of the maintenance site is reported by the worker at the maintenance site in the form of audio and visual information through the wearable device 3, and this maintenance site situation report information indicating the contents of the report is obtained and retained by the maintenance management server 1. At the same time, the maintenance site situation report information is transmitted to the maintenance support terminal 2 taking charge of the maintenance support, and the situation of the maintenance site is played or displayed on the maintenance support terminal 2. A remote maintenance representative (or remote maintenance personnel) in charge of the maintenance support at the maintenance center determines a maintenance strategy on the basis of the maintenance site situation report information played or displayed on the maintenance support terminal 2 and gives a maintenance instruction in the form of audio and visual information through the maintenance support terminal 2. This maintenance instruction information indicating the contents of the maintenance instruction, too, is obtained and retained by the maintenance management server 1 and is played or displayed on the wearable device 3 at the same time. The worker at the maintenance site performs maintenance work based on the maintenance instruction information played or displayed on the wearable device 3. The wearable device 3 refers to, for example, smart glasses that uses augmented reality (AR) technology to display, on glass portions, images or visuals received via a network, such as manufacturing site images captured by a camera installed at a manufacturing site and work instruction images or visuals generated by the maintenance support terminal 2.

Figure 2:
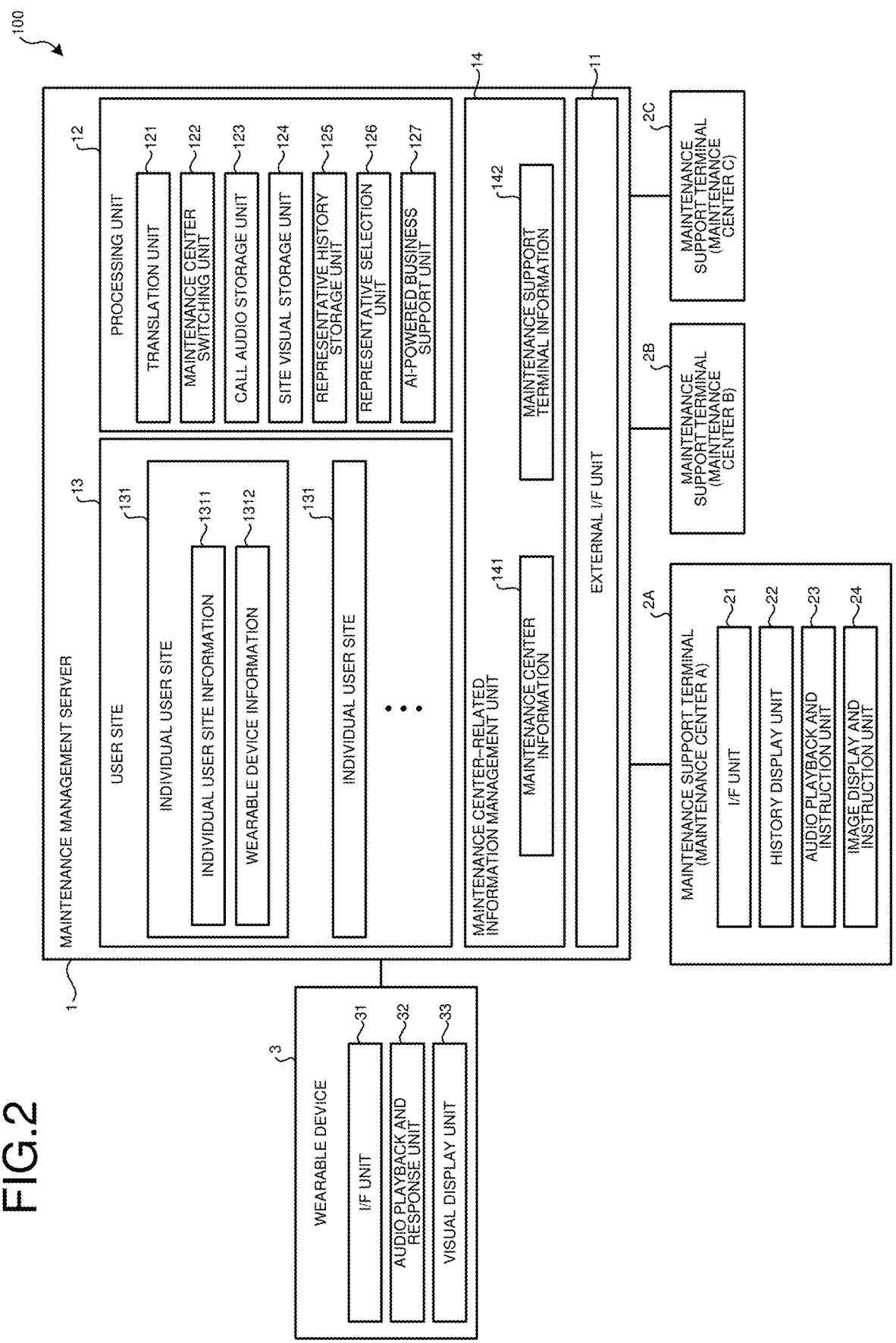
FIG. 2 is a diagram schematically illustrating a complete picture of functions of the maintenance support system.

FIG. 2 is a diagram schematically illustrating a complete picture of functions of the maintenance support system 100.

The maintenance management server 1 includes an external interface (I/F) unit 11, a processing unit 12, a user site 13, and a maintenance center-related information management unit 14.

The external I/F unit 11 receives the maintenance site situation report information in the form of audio and visual information from the wearable device 3, transmits the maintenance site situation report information in the form of audio and visual information to the maintenance support terminal 2, receives the maintenance instruction information in the form of audio and visual information from the maintenance support terminal 2, and transmits the maintenance instruction information in the form of audio and visual information to the wearable device 3.

The processing unit 12 includes a translation unit 121, a maintenance center switching unit 122, a call audio storage unit 123, a site visual storage unit 124, a representative history storage unit 125, a representative selection unit 126, and an artificial intelligence (AI)-powered business support unit 127.

The translation unit 121 translates audio information transmitted and received in real time between the wearable device 3 and the maintenance support terminal 2, such as audio information in the maintenance site situation report and audio information in the maintenance instruction, on the basis of a language set on the wearable device 3 and a language set on the maintenance support terminal 2. Moreover, when the maintenance support terminal 2 obtains, for example, audio information of a past maintenance site situation report that is stored in the call audio storage unit 123, the translation unit 121 translates the audio information into the language set on the maintenance support terminal 2 and outputs the translated audio information to the maintenance support terminal 2. The translation unit 121 is capable of translating not only audio, but also text when the text is added to screens or visuals in maintenance instructions and others. This translation unit 121 translates not only the text added to the screens or visuals to be used during maintenance work, but also text added to screens or visuals stored into the site visual storage unit 124.

The maintenance center switching unit 122 switches to an available maintenance center that will receive maintenance requests from the wearable device 3 on the basis of the standard work hours of the available maintenance center. In other words, the switching is performed to the available maintenance center that is in its standard work hours. Strictly speaking, the maintenance center switching unit 122 switches to an available maintenance support terminal via a gateway of the available maintenance center. The available maintenance support terminal here refers to the maintenance support terminal 2 that takes charge of support (maintenance support) for the maintenance worker having the wearable device 3 of a maintenance requester. The available maintenance center refers to the maintenance center where the available maintenance support terminal is installed. The standard work hours refer to work hours fixed by the available maintenance center, such as from 8:30 to 17:00 local time in a location of the available maintenance center. In cases where the available maintenance support terminal is still in conversation with the wearable device 3 through translation by the translation unit 121, even at an end of the standard work hours of the available maintenance center, the maintenance center switching unit 122 does not switch from the available maintenance support terminal and allows the conversation to continue. In other words, when performing switching from the available maintenance center, the maintenance center switching unit 122 does not perform compulsory switching from the available maintenance support terminal.

The call audio storage unit 123 stores the audio information included in the maintenance site situation report information obtained as the maintenance site situation report from the wearable device 3 and the audio information included in the maintenance instruction information obtained as the maintenance instruction from the maintenance support terminal 2.

The site visual storage unit 124 stores visual information included in the maintenance site situation report information obtained as the maintenance site situation report from the wearable device 3 and visual information included in the maintenance instruction information obtained as the maintenance instruction from the maintenance support terminal 2. The visual information of the maintenance instruction refers to, for example, an AR visual or AR visuals to be displayed on the smart glasses. In addition to the visual information, the site visual storage unit 124 can also store material to be used in maintenance and information other than the audio. The site visual storage unit 124 can also store, for example, abnormal sound produced by production equipment as audio information.

While the call audio storage unit 123 that stores the audio and the site visual storage unit 124 that stores the visuals and others are provided separately in the present embodiment, the call audio storage unit 123 and the site visual storage unit 124 may be combined into one storage unit in another embodiment. In that case, there is no need to provide an area for storing audio that is included in the visuals stored in the site visual storage unit 124 and is stored as overlapping audio in the call audio storage unit 123 as required when the site visual storage unit 124 and the call audio storage unit 123 are provided separately. In other words, there is no need to store the same audio in two storage areas, and a reduced amount of information to be stored is enabled. It is to be noted that separately providing the call audio storage unit 123 and the site visual storage unit 124 enables only call audio to be efficiently stored and played.

The representative history storage unit 125 stores information about a remote maintenance representative who has taken charge of maintenance support for a past failure as representative history information.

When contacted by the wearable device 3 in the event of a failure or the like, the representative selection unit 126 selects a most recent representative from among representatives who are recorded in the representative history storage unit 125 while being associated with the client location (or client site) and connects a calling line between the wearable device 3 and the maintenance support terminal 2 that this representative uses among the maintenance support terminals 2 installed in the available maintenance center. When selecting a first-time representative upon receipt of the notification of the failure, the representative selection unit 126 selects on the basis of representative level information including items such as type of equipment handled, expertise, support experience (including category handled, years handled, client, and client location attribute, among others), and personality, among others. The representative level information is retained in the representative selection unit 126 but may be retained in an external storage unit. When reselecting a representative for the same failure in available maintenance center rotation, the representative selection unit 126 selects the representative who has the same level as the first-time or last-time representative on the basis of the representative level information in order not to cause the client user to feel uncomfortable with the change of representatives (that is to say, for maintained maintenance service quality). In cases where the representative selected upon receipt of the notification from the wearable device 3 is not present, is in the middle of support for another matter, or has another reason, not enabling connection of a communication line between the maintenance support terminal 2 and the wearable device 3, the representative selection unit 126 selects a substitute representative on the basis of the above-mentioned representative level information and connects a calling line between the maintenance support terminal 2 that the selected substitute representative uses and the wearable device 3. In another embodiment, the representative selection unit 126 may select a representative on the basis of the representative level information without checking his or her history in the representative history storage unit 125 and connect a calling line between the maintenance support terminal 2 that the selected representative uses and the wearable device 3.

In cases where, for example, the representative cannot cause connection with the wearable device 3 based on selection control of the representative selection unit 126 to start immediately for providing maintenance support due to, for example, a preparation for takeover of contents of the maintenance support provided earlier by another representative, the maintenance support terminal 2 notifies the representative selection unit 126 of such information (hereinafter referred to as "wait information"), and the representative selection unit 126 selects an appropriate representative in the manner described above, except for the representative having the maintenance support terminal 2 from which the wait information has been received.

When the user has inquired for a measure, the AI-powered business support unit 127 proposes its best and next-best measures to the representative on the basis of a result of analysis of past maintenance information stored in the call audio storage unit 123 and the site visual storage unit 124. The past maintenance information includes (i) a past failure phenomenon relating to the current failure about which the user has inquired, a cause, a measure, progress information, and other information, (ii) a failure phenomenon relating to another failure from the user, a cause, a measure, progress information, and other information, and (iii) a failure phenomenon relating to a failure from another user, a cause, a measure, progress information, and other information, among others. In this way, a gap in information volume or the like due to the change of representatives is filled.

The user site 13 of the maintenance support system 100 manages maintenance-related information for each user. The user site 13 is where the maintenance-related information is associated with each user's wearable device 3, and the maintenance-related information is also associated with the maintenance information obtained via the wearable device 3, such as the call audio and the site visuals, the history of the representative, and other information. In other words, as the wearable device 3 accesses the maintenance management server 1, the wearable device 3 accesses to the corresponding user site 13 thereto on the basis of identification information of the wearable device 3. The maintenance management server 1 connects the maintenance support terminal 2 that is in the standard work hours and the wearable device 3 via the user site 13. By having the representative using the maintenance support terminal 2 provide the maintenance service based on the call audio and other information that are associated with the user site 13 as a connection source, namely an individual user site 131 (described later) and having the representative with the same skill level provide the maintenance service, even when a change of representatives occurs across borders, the maintenance support system 100 is capable of providing the maintenance service that is not only in the same language as a result of translation but also of the same quality. In other words, since the maintenance information and the representative history information are associated with the individual user site 131, when the change of representatives occurs, the maintenance support system 100 is capable of connecting via the individual user site 131 the user to the maintenance representative who provides the same maintenance quality as the last-time maintenance representative, enabling the information necessary for the maintenance to be shared efficiently.

The user site 13 includes a plurality of the individual user sites 131 that each holds information in unit of the contracted client location. Each individual user site 131 manages individual user site information 1311 and wearable device information 1312.

The individual user site information 1311 includes information about the client location contracted for maintenance. The information about the client location refers to basic attribute information about the client location, specifically including attributes of the client, the client location, client location attributes, standard time at the client location, and a default language to be used, among others. Moreover, in the individual user site information 1311, the client location-related audio information stored in the call audio storage unit 123, the client location-related visual information stored in the site visual storage unit 124, and the client location-related representative history information stored in the representative history storage unit 125 are associated for management with the client location information included in the information about the client location. By specifying the client location from a screen of the maintenance support terminal 2, the remote maintenance representative is enabled to have the client location information, the audio information, the visual information, and the representative history information that all relate to the client location displayed in an integrated fashion.

The wearable device information 1312 refers to basic attribute information about the wearable device 3 that belongs to the client location registered in the individual user site information 1311. The basic attribute information about the wearable device 3 specifically includes device attributes, an identification number, attributes of the worker who uses the wearable device 3, and a language to be used, among others.

The maintenance center-related information management unit 14 manages maintenance center information 141 and maintenance support terminal information 142.

The maintenance center information 141 refers to basic attribute information about the maintenance centers that provide the maintenance support. Basic attribute information about the maintenance center specifically includes the location, the standard time, the standard work hours, and a default language to be used, among others.

In the maintenance support terminal information 142, basic attribute information about the maintenance support terminals 2 that belong to the maintenance centers indicated by the maintenance center information 141 is managed. Basic attribute information about the maintenance support terminal 2 specifically includes a name of the representative who uses the terminal, a language to be used by the representative, the representative level information, and representative work schedule information, among others. The representative level information is about the representative and specifically includes any types of equipment handled, the expertise, the support experience, and the personality. The support experience includes any categories handled, years handled, client(s), and client location attributes, among others.

The maintenance support terminals 2A, 2B, and 2C are installed in the differently located maintenance centers. Specifically, the maintenance support terminals 2A are installed in the maintenance center A, the maintenance support terminals 2B are installed in the maintenance center B, and the maintenance support terminals 2C are installed in the maintenance center C. While FIG. 2 illustrates only a configuration of the maintenance support terminal 2A, the maintenance support terminals 2B and 2C have the same configuration as the maintenance support terminal 2A.

Each of the maintenance support terminals 2A to 2C includes an I/F unit 21, a history display unit 22, and an audio playback and instruction unit 23, and an image display and instruction unit 24.

The I/F unit 21 receives the audio and visual maintenance site situation report information from the maintenance management server 1 and transmits the audio and visual maintenance instruction information to the maintenance management server 1.

As the client location to be maintained is specified from the screen, the history display unit 22 collates or displays in the integrated fashion the audio information stored in the call audio storage unit 123, the visual information stored in the site visual storage unit 124, and the representative history information stored in the representative history storage unit 125, all of which are associated for the management with the client location in the individual user site information 1311 of the maintenance management server 1.

The audio playback and instruction unit 23 receives via the maintenance management server 1 and plays the audio of the situation of the maintenance site reported in real time by the wearable device 3, and transmits the audio of the maintenance instruction to the wearable device 3 via the maintenance management server 1.

The image display and instruction unit 24 receives via the maintenance management server 1 and displays the visual(s) of the situation of the maintenance site reported in real time by the wearable device 3, and transmits the visual(s) of the maintenance instruction and others to the wearable device 3 via the maintenance management server 1.

The wearable device 3 includes an I/F unit 31, an audio playback and response unit 32, and a visual display unit 33.

The I/F unit 31 transmits the audio and visual maintenance site situation report information to the maintenance management server 1 and receives the audio and visual maintenance instruction information from the maintenance management server 1.

The audio playback and response unit 32 receives via the maintenance management server 1 and plays the audio of the maintenance instruction from the maintenance support terminal 2, and transmits the audio of the maintenance site situation report to the maintenance support terminal 2 via the maintenance management server 1.

The visual display unit 33 receives via the maintenance management server 1 and displays the visual(s) of the maintenance instruction from maintenance support terminal 2.

Next, how the maintenance management server 1 of the maintenance support system 100 operates is described. Specific descriptions are provided of the operation for a case where a notification of a failure occurred at the maintenance site has been received from the wearable device 3 and the operation that switches to the maintenance support terminal 2 that will take charge of maintenance support.

FIG. 3 is a flowchart illustrating an example of how the maintenance management server 1 operates upon receiving from the wearable device 3 the notification that the failure has occurred.

When the failure has occurred at the maintenance site, the wearable device 3 transmits the notification of the failure, and the maintenance management server 1 receives this notification (step S11).

Upon receiving the notification of the failure, the maintenance management server 1 identifies the client location (step S12). Specifically, the maintenance management server 1 identifies the wearable device 3 that has transmitted the notification of the failure by referring to the wearable device information 1312 of each individual user site 131 and recognizes the basic attributes of the client location to which the wearable device 3 belongs, such as the standard time at the client location, by referring to the wearable device information 1312 and the individual user site information 1311 that are associated with the identified wearable device 3.

Next, the maintenance management server 1 selects the available maintenance center (step S13). The maintenance management server 1 selects, as the available maintenance center, the maintenance center that is in the standard work hours at the point in time at which the notification of the failure has been received.

Next, the maintenance management server 1 selects the available maintenance support terminal (step S14). The maintenance management server 1 selects one of the maintenance support terminals 2 installed in the available maintenance center selected at step S13 as the available maintenance support terminal. Specifically, from among the representatives who are each recorded in the representative history storage unit 125 as the representative history information that is also associated with the client location identified at step S12 in the individual user site information 1311, the maintenance management server 1 selects the most recent representative. The maintenance management server 1 further identifies the maintenance support terminal 2 that is used by that representative by referring to the maintenance support terminal information 142 to connect the calling line between the maintenance support terminal 2 and the wearable device 3. In first-time maintenance of the client location, that is to say, in a case where the representative history storage unit 125 does not have any representative history information associated with the client location, the representative and the maintenance support terminal 2 are selected on the basis of the representative level information about the representative registered in the maintenance support terminal information 142. When the representative is reselected in the available maintenance center rotation (described later), the representative who has the same level as the representative who has provided the preceding support is selected on the basis of the representative level information in order not to cause the client user to feel uncomfortable with the change of representatives.

The above processes of steps S12 to S14 are performed by the representative selection unit 126. Step S12 of identifying the client location and step S13 of selecting the available maintenance center may be performed by the maintenance center switching unit 122 in place of the representative selection unit 126.

Next, the maintenance management server 1 determines translation languages (step S15). Specifically, the translation unit 121 of the maintenance management server 1 determines a source language and a target language on the basis of information about the language to be used that is registered in the wearable device information 1312 and information about the language to be used that is registered in the maintenance support terminal information 142.

After the translation languages are determined, the maintenance management server 1 starts the remote maintenance service (step S16). Specifically, the maintenance management server 1 requests the maintenance support terminal 2 selected at step S14 to start the remote maintenance support through the wearable device 3 that has transmitted the notification of the failure. Upon receiving a notification that starting the remote maintenance support is possible, the maintenance management server 1 starts, as a response, the remote maintenance service and notifies the wearable device 3 of such information. In cases where the maintenance management server 1 receives from the maintenance support terminal 2 selected at step S14 a notification that starting the remote maintenance support is not possible, the maintenance management server 1 performs the processes of steps S14 and S15 again to select the available maintenance support terminal and determine the translation languages. In this case, the selection of the available maintenance support terminal is such that except for the maintenance support terminal 2 that has notified that starting the remote maintenance support is not possible, the maintenance support terminal 2 of a most recent representative is selected from among the maintenance support terminals 2 of the representatives who are each recorded in the representative history storage unit 125 as the representative history information that is also associated with the client location identified at step S12. In cases where every representative who has previously taken charge of the remote maintenance service through the wearable device 3 that has transmitted the notification of the failure is unable to start the remote maintenance support, the available maintenance support terminal is selected in the same way as the available maintenance support terminal is selected in "the first-time maintenance" in the above description of step S14.

When the remote maintenance service is finished thereafter (step S17), the maintenance management server 1 updates the representative history information stored in the representative history storage unit 125 (step S18) and ends its operation.

FIG. 4 is a flowchart illustrating an example of how the maintenance management server 1 operates in switching to the maintenance support terminal 2 that will take charge of the maintenance support.

When the end of the standard work hours comes for the available maintenance center currently in charge of the maintenance support for a certain failure, the maintenance management server 1 determines that it is time to rotate the maintenance centers (step S21) and selects the maintenance center that will take over (step S22). Specifically, at the end of the standard work hours of the maintenance center where the maintenance support terminal 2 is in the remote support service for the certain failure, the maintenance center switching unit 122 of the maintenance management server 1 selects the maintenance center that, in its standard work hours, can provide remote maintenance for this failure as the takeover maintenance center. The maintenance center switching unit 122 may perform step S22 of selecting the takeover maintenance center before the end of the standard work hours, for example, one minute before the end of the standard work hours.

Next, the maintenance management server 1 selects the available maintenance support terminal (step S23). The maintenance management server 1 selects one of the maintenance support terminals 2 installed in the takeover maintenance center selected at step S22 as the available maintenance support terminal. Specifically, from among the representatives who are each recorded in the representative history storage unit 125 as the representative history information that is also associated in the individual user site information 1311 with the client location for which the time for the maintenance center rotation has come, the representative selection unit 126 first selects the most recent representative. The representative selection unit 126 further identifies the maintenance support terminal 2 that is used by that representative by referring to the maintenance support terminal information 142 to connect a calling line between the maintenance support terminal 2 and the wearable device 3. In first-time maintenance of the client location, that is to say, in a case where the representative history storage unit 125 does not have any representative history information associated with the client location, the representative and the maintenance support terminal 2 are selected on the basis of the representative level information about the representative registered in the maintenance support terminal information 142. When the representative is reselected in the available maintenance center rotation, the representative who has the same level as the representative who has provided the preceding support is selected on the basis of the representative level information in order not to cause the client user to feel uncomfortable with the change of representatives. This means that when the (representative) level of the most recent representative (as a candidate for the representative to replace) recorded as the representative history information in the representative history storage unit 125 differs greatly from the level of the current representative, namely the representative who has provided the preceding support, the representative whose representative level is comparable to that of the current representative is selected rather than the most recent representative. Above step S23 is the same process as step S14 of FIG. 3 described above.

Next, the maintenance management server 1 determines the translation languages (step S24). Specifically, the translation unit 121 of the maintenance management server 1 determines the source and target languages to be used after the available maintenance support terminal switching on the basis of the information about the language to be used that is registered in the wearable device information 1312 and the information about the language to be used that is registered in the maintenance support terminal information 142.

Next, the maintenance management server 1 carries out a takeover procedure (step S25). At this step S25, the maintenance center switching unit 122 requests the takeover representative who uses the maintenance support terminal 2 selected at step S23 and the current representative to perform the takeover. As the maintenance center switching unit 122 receives a notification that the takeover is finished from both the representatives who have completed the takeover, the takeover procedure is completed.

When the takeover procedure is completed, the maintenance management server 1 performs switching to the available maintenance support terminal (step S26), resumes the remote maintenance (step S27), and ends its operation. At step S26, the maintenance center switching unit 122 disconnects the wearable device 3 from the maintenance support terminal 2 currently in charge and connects the wearable device 3 to the maintenance support terminal 2 that has taken over. At this point in time, the maintenance center switching unit 122 performs translation language switching that does not cause the client user to feel uncomfortable. As a result, the remote maintenance is resumed.

As described above, the maintenance support system 100 according to the present embodiment includes the wearable device 3 that the on-site maintenance worker has, the maintenance support terminals 2 installed in the at least three maintenance centers with the different standard work hours located worldwide, and the maintenance management server 1 connected to the wearable device 3 and the maintenance support terminals 2. The maintenance management server 1 includes the call audio storage unit 123 and the site visual storage unit 124 that store the audio and visual information reported by the on-site maintenance worker through the wearable device 3, and the translation unit 121 that translates the audio information. The translation unit 121 translates the audio information obtained from the wearable device 3 on the basis of the language set on the wearable device 3 and the language set on maintenance support terminal 2 and translates the audio information stored in the call audio storage unit 123 into the supported language of the maintenance support terminal 2. Therefore, the on-site maintenance worker is enabled to receive the maintenance service 24 hours a day in the language set on the wearable device 3, and the remote maintenance representative who uses the maintenance support terminal 2 is enabled to obtain the maintenance site situation report information in the form of the audio and visual information from the maintenance site, listen to the maintenance site situation report information in his or her language, and give the maintenance instruction in his or her language.

The maintenance management server 1 also includes the maintenance center switching unit 122 that manages timing of the translation language switching in the maintenance center rotation. After receiving the notification that the takeover is completed from the maintenance support terminal 2 installed in the maintenance center that is a switching destination, the maintenance center switching unit 122 performs the translation language switching on the basis of the language set on the wearable device 3 and the language set on the maintenance support terminal 2 that has sent the notification of the completion of the takeover. Therefore, the provided translation language switching is smooth enough not to cause the client user to feel uncomfortable despite the fact that the remote maintenance representatives of the at least three different maintenance centers located worldwide rotate to take charge of the 24-hour maintenance support.

The maintenance management server 1 also includes the representative history storage unit 125 that stores the representative history information, which is the information about the representative from the past maintenance support, and the representative selection unit 126. When contacted by the wearable device 3, the representative selection unit 126 connects the calling line between the wearable device 3 and the maintenance support terminal 2 that, among the maintenance support terminals 2 installed in the maintenance center capable of providing the maintenance service, is used by the most recent representative among the representatives who are each recorded as the representative history information. This ensures that the same representative takes charge of the maintenance support for the same failure, enabling the continued maintenance support to be provided at the same level.

A description is provided next of a hardware configuration of the maintenance management server 1 in the maintenance support system 100. FIG. 5 is a diagram illustrating an example of hardware that is used to implement the maintenance management server 1 of the maintenance support system 100.

The maintenance management server 1 can be implemented with a processor 101, a memory 102, and a communication device 103. Examples of the processor 101 include a central processing unit (CPU) that is also referred to as a processing unit, an arithmetic unit, a microprocessor, a microcomputer, or a digital signal processor (DSP) and a system large-scale integration (LSI). Examples of the memory 102 include a magnetic disk and a nonvolatile or volatile semiconductor memory such as a random-access memory (RAM), a read-only memory (ROM), or a flash memory, among others.

The processing unit 12, the user site 13, and the maintenance center-related information management unit 14 of the maintenance management server 1 are implemented when programs that operate as these components are executed by the processor 101. The programs that operate as the processing unit 12, the user site 13, and the maintenance center-related information management unit 14 are prestored in the memory 102. The processor 101 reads and executes the programs from the memory 102 to operate as the processing unit 12, the user site 13, and the maintenance center-related information management unit 14.

The external I/F unit 11 of the maintenance management server 1 is implemented with the communication device 103. The memory 102 illustrated in FIG. 5 also stores the various information necessary for the maintenance management server 1 to perform the various operations described above, namely the audio information, the visual information, the representative history information, the maintenance center information 141, the maintenance support terminal information 142, the individual user site information 1311, and the wearable device information 1312, among others.

The processor 101, the memory 102, and the communication device 103 that are illustrated in FIG. 5 may be hardware of an electronic computer. In other words, in one embodiment, the maintenance management server 1 may be implemented with the electronic computer and the programs that are executed by the electronic computer. In one embodiment, a plurality of the electronic computers may operate in conjunction with each other to implement the functions of the maintenance management server 1.

While the hardware used to implement the maintenance management server 1 has been described, the maintenance support terminal 2, too, can be implemented with hardware identical to the hardware used to implement the maintenance management server 1. However, in addition to the processor 101 and the others that are illustrated in FIG. 5, a display device such as a display, input devices such as a mouse, a keyboard, and a microphone, and an output device such as a speaker are additionally required to implement the maintenance support terminal 2.

The above configurations illustrated in the embodiment are illustrative, can be combined with other techniques that are publicly known, and can be partly omitted or changed without departing from the gist. The embodiments can be combined together.

REFERENCE SIGNS LIST

1 maintenance management server; 2A, 2B, 2C maintenance support terminal; 3 wearable device; 11 external I/F unit; 12 processing unit; 13 user site; 14 maintenance center-related information management unit; 21, 31 I/F unit; 22 history display unit; 23 audio playback and instruction unit; 24 image display and instruction unit; 32 audio playback and response unit; 33 visual display unit; 100 maintenance support system; 121 translation unit; 122 maintenance center switching unit; 123 call audio storage unit; 124 site visual storage unit; 125 representative history storage unit; 126 representative selection unit; 127 AI-powered business support unit; 131 individual user site; 141 maintenance center information; 142 maintenance support terminal information; 1311 individual user site information; 1312 wearable device information.

The invention claimed is:

1. A maintenance support system comprising:
   a wearable device to provide an on-site maintenance worker with maintenance instruction information indicating contents of maintenance work to be performed by the on-site maintenance worker;
   a plurality of maintenance support terminals installed in a plurality of regions having time differences, at least one of the maintenance support terminals being installed in each of the plurality of regions; and
   a maintenance management server connected to the wearable device and the maintenance support terminals, wherein
   the maintenance management server includes
   representative selection circuitry to select, from among the maintenance support terminals installed in a region belonging to standard work hours, a maintenance support terminal that takes charge of maintenance support for the on-site maintenance worker on a basis of representative level information, the standard work hours being fixed for each of the plurality of regions, and
   translation circuitry to translate audio information transmitted and received between the wearable device and the maintenance support terminal selected by the representative selection circuitry on a basis of a language set on the wearable device and a language set on a maintenance support terminal selected by the representative selection circuitry,
   when the representative selection circuitry selects a maintenance support terminal that takes charge of maintenance support for the on-site maintenance worker,
   in a case where one or more remote maintenance representatives who have previously supported the on-site maintenance worker who is a maintenance support target are present, the representative selection circuitry selects a maintenance support terminal that takes charge of maintenance support for the on-site maintenance worker from one or more maintenance support terminals that the one or more remote maintenance representatives use, in a case where no remote maintenance representative who has previously supported the on-site maintenance worker who is a maintenance support target is available, the representative selection circuitry selects a maintenance support terminal which is used by a remote maintenance representative having a level comparable to a level of a remote maintenance representative previously supported the on-site maintenance worker who is a maintenance support target, as a maintenance support terminal that takes charge of maintenance support for the on-site maintenance worker, the wearable terminal transmits on-site audio and visual to the maintenance support terminal selected by the representative selection circuitry, and the maintenance support terminal selected by the representative selection circuitry provides, by playing, the on-site audio and visual received from the wearable device for the remote maintenance representative and accepts an instruction for the on-site maintenance worker from the remote maintenance representative.

2. The maintenance support system according to claim 1, wherein when switching is performed from the maintenance support terminal that takes charge of maintenance support for the on-site maintenance worker to a maintenance support terminal installed in a different region, the translation circuitry selects languages to be used in translation of audio information that is transmitted and received between the wearable device and the maintenance support terminal installed in the different region on a basis of the language set on the wearable device and a language set on the maintenance support terminal installed in the different region.

3. The maintenance support system according to claim 1, wherein when switching is performed from the maintenance support terminal that takes charge of maintenance support for the on-site maintenance worker to a maintenance support terminal installed in a different region, the representative selection circuitry selects, as a switching destination, a maintenance support terminal used by a remote maintenance representative previously in charge of maintenance support for the on-site maintenance worker.

4. The maintenance support system according to claim 1, comprising representative history storage circuitry to store, as representative history information, information on a remote maintenance representative who has taken charge of maintenance support for a past failure, wherein when maintenance support for the on-site maintenance worker is started, the representative selection circuitry selects a maintenance support terminal used by a most recent remote maintenance representative who has taken charge of maintenance support for the on-site maintenance worker.

5. The maintenance support system according to claim 1, wherein the maintenance management server includes an individual user site for each of a plurality of sites, the individual user site associating, for management, information on a location of the site with audio and visual information obtained at the site, and when the maintenance support terminal specifies a site from among the plurality of sites, the maintenance management server transmits audio and visual information associated with the site specified by the maintenance support terminal to the maintenance support terminal.

6. A maintenance support method for a maintenance support system including a wearable device that provides an on-site maintenance worker with maintenance instruction information indicating contents of maintenance work to be performed by the on-site maintenance worker, a plurality of maintenance support terminals installed in a plurality of regions having time differences so that at least one of the maintenance support terminals is installed in each of the plurality of regions, and a maintenance management server connected to the wearable device and the maintenance support terminals, the maintenance support method comprising:

selecting, by the maintenance management server, a maintenance support terminal that takes charge of maintenance support for the on-site maintenance worker from among the maintenance support terminals installed in a region belonging to standard work hours on a basis of representative level information, the standard work hours being fixed for each of the plurality of regions; and translating, by the maintenance management server, audio information transmitted and received between the wearable device and the selected maintenance support terminal on a basis of a language set on the wearable device and a language set on the selected maintenance support terminal, wherein when the maintenance management server selects a maintenance support terminal that takes charge of maintenance support for the on-site maintenance worker, in a case where one or more remote maintenance representatives who have previously supported the on-site maintenance worker who is a maintenance support target are present, the maintenance management server selects a maintenance support terminal that takes charge of maintenance support for the on-site maintenance worker from one or more maintenance support terminals that the one or more remote maintenance representatives use, in a case where no remote maintenance representative who has previously supported the on-site maintenance worker who is a maintenance support target is available, the maintenance management server selects a maintenance support terminal which is used by a remote maintenance representative having a level comparable to a level of a remote maintenance representative previously supported the on-site maintenance worker who is a maintenance support target, as a maintenance support terminal that takes charge of maintenance support for the on-site maintenance worker, the maintenance support method further includes:

transmitting, by the wearable terminal, on-site audio and visual to the selected maintenance support terminal, and providing, by playing, the on-site audio and visual received from the wearable device for the remote maintenance representative and accepting an instruction for the on-site maintenance worker from the remote maintenance representative, by the selected maintenance support terminal.

7. The maintenance support method according to claim 6, comprising
selecting, when switching is performed from the maintenance support terminal that takes charge of maintenance support for the on-site maintenance worker to a maintenance support terminal installed in a different region, languages to be used in translation of audio information that is transmitted and received between the wearable device and the maintenance support terminal installed in the different region on a basis of the language set on the wearable device and a language set on the maintenance support terminal installed in the different region.

8. The maintenance support method according to claim 6, comprising
selecting, as a switching destination, when switching is performed from the maintenance support terminal that takes charge of maintenance support for the on-site maintenance worker to a maintenance support terminal installed in a different region, a maintenance support terminal used by a remote maintenance representative previously in charge of maintenance support for the on-site maintenance worker.

9. A maintenance management server connected to a wearable device and a plurality of maintenance support terminals, the wearable device providing an on-site maintenance worker with maintenance instruction information indicating contents of maintenance work to be performed by the on-site maintenance worker, and the plurality of maintenance support terminals being installed in a plurality of regions having time differences so that at least one of the maintenance support terminals is installed in each of the plurality of regions, wherein
the maintenance management server comprises:
representative selection circuitry to select, from among the maintenance support terminals installed in a region belonging to standard work hours, a maintenance support terminal that takes charge of maintenance support for the on-site maintenance worker on a basis of representative level information, the standard work hours being fixed for each of the plurality of regions; and
translation circuitry to translate audio information transmitted and received between the wearable device and the maintenance support terminal selected by the representative selection circuitry on a basis of a language set on the wearable device and a language set on a maintenance support terminal selected by the representative selection circuitry,
when the representative selection circuitry selects a maintenance support terminal that takes charge of maintenance support for the on-site maintenance worker,
in a case where one or more remote maintenance representatives who have previously supported the on-site maintenance worker who is a maintenance support target are present, the representative selection circuitry selects a maintenance support terminal that takes charge of maintenance support for the on-site maintenance worker from one or more maintenance support terminals that the one or more remote maintenance representatives use,
in a case where no remote maintenance representative who has previously supported the on-site maintenance worker who is a maintenance support target is available, the representative selection circuitry selects a maintenance support terminal which is used by a remote maintenance representative having a level comparable to a level of a remote maintenance representative previously supported the on-site maintenance worker who is a maintenance support target, as a maintenance support terminal that takes charge of maintenance support for the on-site maintenance worker,
the wearable terminal transmits on-site audio and visual to the maintenance support terminal selected by the representative selection circuitry, and
the maintenance support terminal selected by the representative selection circuitry provides, by playing, the on-site audio and visual received from the wearable device for the remote maintenance representative and accepts an instruction for the on-site maintenance worker from the remote maintenance representative.

10. The maintenance management server according to claim 9, wherein
when switching is performed from the maintenance support terminal that takes charge of maintenance support for the on-site maintenance worker to a maintenance support terminal installed in a different region, the translation circuitry selects languages to be used in translation of audio information that is transmitted and received between the wearable device and the maintenance support terminal installed in the different region on a basis of the language set on the wearable device and a language set on the maintenance support terminal installed in the different region.

11. The maintenance management server according to claim 9, wherein
when switching is performed from the maintenance support terminal that takes charge of maintenance support for the on-site maintenance worker to a maintenance support terminal installed in a different region, the representative selection circuitry selects, as a switching destination, a maintenance support terminal used by a remote maintenance representative previously in charge of maintenance support for the on-site maintenance worker.

12. The maintenance management server according to claim 9, comprising
representative history storage circuitry to store, as representative history information, information on a remote maintenance representative who has taken charge of maintenance support for a past failure, wherein
when maintenance support for the on-site maintenance worker is started, the representative selection circuitry selects a maintenance support terminal used by a most recent remote maintenance representative who has taken charge of maintenance support for the on-site maintenance worker.

13. The maintenance management server according to claim 9, comprising
an individual user site for each of a plurality of sites, the individual user site associating, for management, information on a location of the site with audio and visual information obtained at the site, and
wherein, when the maintenance support terminal specifies a site from among the plurality of sites, the maintenance management server transmits audio and visual information associated with the site specified by the maintenance support terminal to the maintenance support terminal.

* * * * *